US011486775B1

(12) United States Patent
Dickens et al.

(10) Patent No.: US 11,486,775 B1
(45) Date of Patent: Nov. 1, 2022

(54) MULTIPLE-WAVELENGTH TRIBOLUMINESCENT OPTICAL FIBER SENSOR

(71) Applicant: Florida A&M University, Tallahassee, FL (US)

(72) Inventors: Tarik J. Dickens, Tallahassee, FL (US); Kunal Joshi, Tallahassee, FL (US); Phong Tran, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 368 days.

(21) Appl. No.: 16/743,783

(22) Filed: Jan. 15, 2020

Related U.S. Application Data (60) Provisional application No. 62/792,700, filed on Jan. 15, 2019.

(51) Int. Cl.
*G01L 1/24* (2006.01)
*G01N 21/95* (2006.01)
*G02B 6/02* (2006.01)

(52) U.S. Cl.
CPC .............. *G01L 1/242* (2013.01); *G01N 21/95* (2013.01); *G02B 6/02052* (2013.01); *G01N 2201/088* (2013.01)

(58) Field of Classification Search
CPC .. G01L 1/242; G01N 21/95; G01N 2201/088; G02B 6/02052
See application file for complete search history.

(56) References Cited

U.S. PATENT DOCUMENTS

| 4,020,765 | A | 5/1977 | Glass et al. | |
|---|---|---|---|---|
| 5,905,260 | A * | 5/1999 | Sage | G01L 1/24 252/301.6 F |
| 6,581,474 | B2 * | 6/2003 | Goods | G01P 15/001 73/800 |
| 6,710,328 | B1 * | 3/2004 | Mastro | G01L 1/24 250/227.14 |
| 6,820,496 | B2 * | 11/2004 | McElhanon | G01P 15/001 73/800 |
| 7,242,443 | B2 * | 7/2007 | Sage | C09K 11/06 252/301.16 |
| 7,270,770 | B2 * | 9/2007 | Sage | F21K 2/04 556/14 |
| 7,307,702 | B1 * | 12/2007 | Mathur | G01L 1/24 73/800 |

(Continued)

OTHER PUBLICATIONS

Joshi, Kunal et al. Concrete-fiber-reinforced polymer interfacial bond monitoring with self-triggering sensors. Journal of Intelligent Material Systems and Structures, 2018. vol. 29(12), 2557-2569.

*Primary Examiner* — John Bedtelyon
(74) *Attorney, Agent, or Firm* — Owen Behrens; Smith & Hopen, P.A.

(57) ABSTRACT

Embodiments of the present invention include a system and method for detecting or sensing damage within a target material, as well as related devices. In some embodiments, a damage sensing system including a target material, an optical fiber embedded into the target material, where the optical fiber has an outer surface running the length of the optical fiber, a photosensitive receiver, and a triboluminescent coating coated on the optical fiber.

20 Claims, 6 Drawing Sheets

(56) References Cited

U.S. PATENT DOCUMENTS

| | | | | |
|---|---|---|---|---|
| 8,593,153 B2* | 11/2013 | Medelius | ............... | H01B 7/328 |
| | | | | 324/543 |
| 9,267,378 B2* | 2/2016 | Delvaux | .................... | F01D 5/28 |
| 9,274,025 B2* | 3/2016 | Okoli | ................. | G02B 6/02033 |
| 10,386,305 B2* | 8/2019 | Okoli | ................... | G01M 5/0016 |
| 10,718,674 B1* | 7/2020 | Ryu | ....................... | G01L 5/0052 |
| 2013/0098164 A1* | 4/2013 | Okoli | ................. | G02B 6/02033 |
| | | | | 385/12 |
| 2017/0328741 A1* | 11/2017 | Okoli | ................. | G01N 21/9515 |
| 2020/0124487 A1* | 4/2020 | Okoli | ..................... | G01N 21/70 |

* cited by examiner

MULTIPLE-WAVELENGTH TRIBOLUMINESCENT OPTICAL FIBER SENSOR

CROSS-REFERENCE TO RELATED APPLICATIONS

This non-provisional application is a continuation of and claims priority to Provisional Application No. 62/792,700 entitled "Multiple-Wavelength Triboluminescent Optical Fiber Sensor," filed Jan. 15, 2019 by the same inventors.

BACKGROUND OF THE INVENTION

1. Field of the Invention

This invention relates, generally, to a multiple-wavelength triboluminescent optical fiber sensor. More specifically, the invention relates to an optical fiber sensor for in-situ structural damage diagnosis.

2. Brief Description of the Prior Art

An indicating sensor providing a pulse of detectable light would be a useful method for verifying whether or not various internal system functions have activated, or whether or not certain parameters of an internal system have been exceeded. Events such as movement of mechanical actuators, pistons, or gears, the activation of an explosive actuator, acceleration loads such as impact events (beyond a predetermined level), and the like are examples of binary threshold events to which a shock-sensitive indicator device could be applied.

Light which results from energy supplied to a material in the form of mechanical energy is known as triboluminescence; also referred to as mechanoluminescence or fractoluminescence. The effect is thought to arise through fracture or cleavage of individual crystals of a certain class of solid materials together with a concomitant electrical breakdown. However, the effect is poorly understood and may be the result of any input of mechanical energy which provides frictional force, or some amount of strain energy, to a particle of the identified class of materials even of non-crystalline materials. Furthermore, the effect may arise also as the result of an electric charge separation as new interfacial surface is created as the material is either cleaved or breaks free and separates from a surrounding host matrix in which the material is embedded. It is known that when mechanical energy is imparted to certain compounds these compounds emit light energy and that this effect is intense enough in certain materials to be easily detectable. The observed range of light wavelengths runs from red to deep ultraviolet.

Fiber optic sensors are broadly accepted as a structural health monitoring device for fiber-reinforced polymer materials by integrating the sensors in the host material. Recent developments in fiber optic sensor technology is the mechanoluminescence-based optoelectronic sensor.

While triboluminescence is a well-known phenomenon its application to physical sensors is limited. U.S. Patent 4,020,765 to Glass et al., describes a munitions fuse relying upon a light signal generated by ordnance of a triboluminescent material coating the inside of the ordnance nosecone as the ordnance strikes a target. U.S. Patent 5,905,260 to Sage et al., describes a sensor for detecting damage in aircraft structures by connecting a piece of light-guiding optical fiber with a triboluminescent material. Damage to the structure is recorded by light pulses generated by fracture of a plurality of triboluminescent crystals.

U.S. Patent 6,710,328 to Mastro et al., describes a system for remotely detecting mechanical damage, such as fracture or delamination in a structure of any kind, such as a composite structure like a matrix composite or laminar composite. Mastro uses a combination of fiber optics and triboluminescence adapted to association with the target object so that a mechanical event attendant the damage is capable of causing the triboluminescence to emit light transmissible by the fiber optics. The Mastro device is connectable to a photodetector.

U.S. Patent 9,274,025 to Okoli et al., describes an apparatus with an optical fiber with an outer surface extending a length of the optical fiber with a triboluminescent material provided on the outer surface of the optical fiber, where the triboluminescent material provides an optical emission when subjected to an emitting condition.

U.S. Patent 6,581,477 to Goods et al., describes a system and device incorporating triboluminescent constituents for providing a transient source of light emission, in some cases converted into an electrical signal. Goods also describes providing a means for containing triboluminescent constituent materials suspended in a low density, frangible solid media. The Goods device is adapted to crush the frangible solid media upon occurrence of a specific event.

While certain aspects of conventional technologies have been discussed to facilitate disclosure of the instant application. Applicants in no way disclaim these technical aspects, and it is contemplated that the instant application may encompass one or more of the conventional technical aspects discussed herein.

The present disclosure may address one or more of the problems and deficiencies in the art discussed above. However, it is contemplated that this disclosure may prove useful in addressing other problems and deficiencies in many technical areas. Therefore, the present application should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a damage sensing system for detecting damage within a target material in real-time is now met by a new, useful, and nonobvious invention.

The novel structure includes a damage sensing system including a target material, an optical fiber embedded into the target material, wherein the optical fiber comprises an outer surface made up of a first half and a second half running the length of the optical fiber; a photosensitive receiver operably coupled to at least one end of the optical fiber; a triboluminescent coating coated on to a least a part of the length of the optical fiber, wherein the triboluminescent coating coats the first half and the second half of the outer surface of the optical fiber; wherein the triboluminescent coating on the first half of the outer surface of the optical fiber comprises a first triboluminescent material; wherein the triboluminescent coating on the second half of the outer surface of the optical fiber comprises a second triboluminescent material; wherein the first and second triboluminescent materials provide optical emission when subjected to an emitting condition and at least a portion of the optical emission is received by the optical fiber and guided through the length of the optical fiber to the photosensitive receiver; and, wherein the triboluminescent coated optical fiber is configured to be embedded into the target material, wherein the target material contains no triboluminescent material.

In additional embodiments, the damage sensing system, wherein the optical fiber is one of: a polymer optical fiber, a glass-based optical fiber, a single mode optical fiber, or a multi-mode optical fiber.

In additional embodiments, the damage sensing system, wherein the triboluminescent material is an epoxy dispersed with triboluminescent crystals.

In additional embodiments, the damage sensing system, wherein the triboluminescent crystals comprise ZnS:Mn crystals.

In additional embodiments, the damage sensing system, wherein the emitting condition is any one of a stress, fracture, tear, scratch, or any other kind of damage to the target material.

In additional embodiments, the damage sensing system, further comprising a least one processor running software and coupled to the photosensitive receiver to determine the occurrence and severity of the emitting condition.

In further embodiments, a method for detecting damage, comprising: providing a target material; providing an optical fiber comprising an outer surface embedded in the target material; providing a triboluminescent coating coated directly on the outer surface of the optical fiber; and, coupling the optical fiber to a photosensitive receiver so that the triboluminescent material emits an optical emission when subjected to an emitting condition that is transmitted through the optical fiber to the photosensitive receiver; wherein the optical emission provides data regarding the emitting condition.

In further embodiments, the coating and inclusion method is generalized and includes at least optical fiber drawing, wherein the luminescent materials are included and processed in the optical fiber drawing manufacturing process. In this embodiment, the luminescent material is inside the optical fiber.

In further embodiments, the sensor acts as a compression and tension mode sensor.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
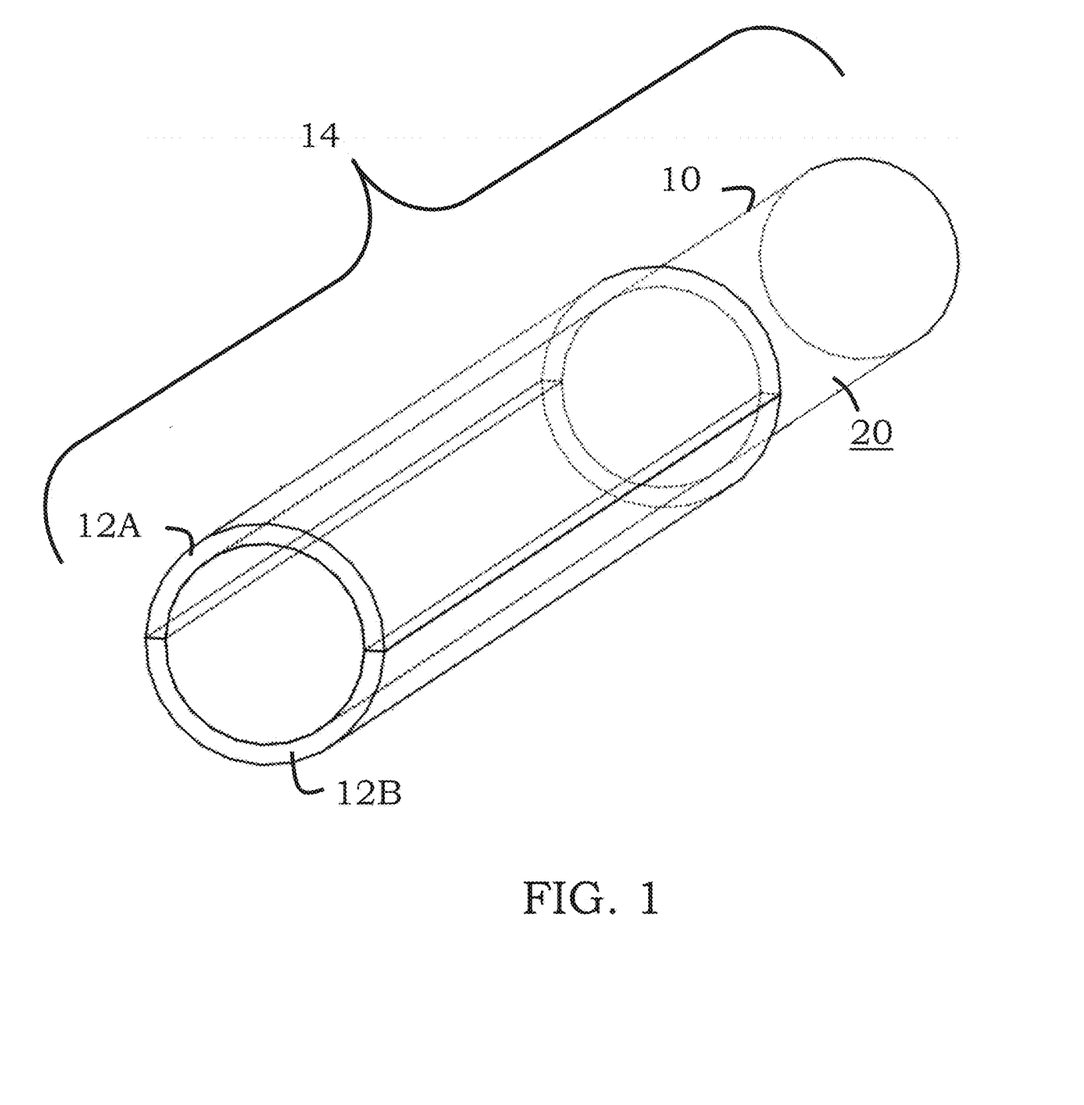
FIG. 1 depicts a PMMA based optical fiber with triboluminescent materials covering the outer surface of the optical fiber.

FIG. 1 depicts an optical fiber sensor for in-situ structural damage diagnosis with two or more triboluminescent materials covering outer surface 20 of optical fiber 10. Optical fiber 10 may then be embedded in target materials 16 to be structurally diagnosed. Damage to target material 16 under consideration may result in a triboluminescent emission of multiple wavelengths of triboluminescence resulting from crystal deformation or fracture.

Analysis of the triboluminescent emission provides information on the occurrence, severity, and location of damage within target material 16 in which triboluminescent sensor 14 is embedded. The use of multiple triboluminescent crystals allows the classification of the damage modes in a composite, such as compression and tension. This technology allows for real-time, distributed damage sensing and diagnosis upon the onset of barely visible damage.

Triboluminescent material 12, as depicted in FIGS. 1-4, is coated on a bare polymethyl methacrylate (PMMA) based optical fiber 10 with first triboluminescent material 12A covering a first half of optical fiber 10 along its length while second triboluminescent material 12B covering a second half. The emissions from triboluminescent materials 12 are recorded using photosensitive receiver 18 (e.g., photo-multiplier tube 18) and analyzed using MATLAB® or similar program. Triboluminescent sensor 14 enables damage mode classification in composites. By doing so the classification and diagnosis of damage can identify the modes of damage in target material 16 (e.g., a fiber-reinforced polymer or in any structural material) that demonstrates barely to no visible damage. This technology serves as a real-time, distributed sensor in structural members.

Triboluminescent sensors 14 have been tested in fiber-reinforced polymer composites, vinyl ester resins, epoxy adhesives, acrylonitrile butadiene styrene (ABS), and concrete.

Concrete beams strengthened with multifunctional fiber-reinforced polymer laminates were tested in shear using fiber optic sensors to evaluate bond strength of the composite system. Joshi, K. et al., *Concrete-fiber-reinforced polymer interfacial bond monitoring with self-triggering sensors,* Journal of Intelligent Material Systems and Structures, vol 29, issue 12, pgs. 2557-2569 (May 27, 2018).

Triboluminescent sensor 14 (physical failure-to-luminescence) constructed from in-house micro-wires to detect multiscale damage in composites was constructed. Triboluminescence mechanisms are utilized in a continuous microsensor (µ-sensor) that contain elements of nanoscale reinforcement to create a structural-electronic device for micro-detection capabilities of the triboluminescent sensor mechanism and array. A technique known as "Solu-Molding" is 3D printed using a commercial soluble compound to meet the desired dimensions and geometry, including composite processing for negative draft of an entire structure or spliced component. In-situ Triboluminescent Optical Fiber (μ-sensors), by its trade name, are embedded in fiber-reinforced structural composites to provide a sensory system. 12 GF panels were tested for impact damage and the performance of the sensory system to detect micro-damage is reported. An array size of less than 6.5 cm2 was able to detect low-velocity impact damage. Segmental and junction analysis were performed to verify the accuracy of the proposed sensory system response.

Various alternatives for triboluminescent crystals have been used including ZnS:Mn and EuD4TEA, as well as combinations of the above, including ZnS:Cu. The emissions data from the triboluminescent crystals are recorded using a digital imaging process. The system is capable of recording eight (8) ends of an optical fiber, which enables recording of the triboluminescent emissions from multiple sensors.

Embodiments of the claimed subject matter provide a method of sensing damage in a target material, object, or region 16. The method includes integrating triboluminescent materials 12 with target material 16 and associating at least one optical fiber 10 with target material 16 object and with photosensitive receiver 18. Optical fiber 10 is associated with target material 16 and photosensitive material 12 so that, following a damage-causing event accompanied by mechanical action upon at least some of the integrated triboluminescent light emanation is transmitted by at least one optical fiber 10 to photosensitive receiver 18. Photosensitive sensor 14 then produces an electronic indication of the event, which can be any one of an identification, registration, recordation, representation, readout, signal, digitization, processing, or display of at least some of the transmitted light.

Optical fiber 10 can be any one of an optical thread, line, fiber, filament, or strands, which can be embedded in a composite structure. Triboluminescent material 26 coating optical fiber 10 allows for the detection of damage occurring along optical fiber's 10 length, which detects damage occurring within the target material 16. Triboluminescent sensors 14 can be embedded in any composite structure including, but not limited to, buildings, support structures, piping, propellers, hull sections, and machinery components. Triboluminescent sensors 14 may also be applied to non-composite target materials 16 as well, so long as the material allows for association with triboluminescent sensors 14. Triboluminescent sensors 14 may be inserted after target material 16 has been manufactured, or by means of molding optical fibers 10 into target material 16 during manufacture or construction.

Triboluminescent sensors 14 are especially suited for the claimed subject matter. Triboluminescent sensors 14 can be made to be relatively small in diameter and weight yet maintain a great deal of durability. Triboluminescent sensors 14 are immune to electromagnetic interference and can provide distributed or multiplexed measurements. Moreover, triboluminescent sensors 14 lend themselves to being embedded into target materials 16, such as rubber, plastic, composites, and metals.

Example 1—New approach to control the sensitivity and responding range of triboluminescent sensors Triboluminescent materials 12 react differently to applied force in terms of wavelength and light intensity. For example, the emission peak positions for the triboluminescent spectra of ZnS:Mn and ZnS:Cu are at 585 nm and 515 nm, respectively. Therefore, by using photosensitive receivers 18 that can detect light intensity at different wavelengths, we can utilize the tribolutninescent system with multi-materials for structural health monitoring purposes. Additionally, the hardness (brittleness vs ductileness) of target material 16 defines the intensity and sensitivity of emitted signals of triboluminescent materials 12 when target material 16 is under mechanical load. For example, ductile triboluminescent materials 12 has low signal, but it can detect a higher load. Meanwhile, brittle triboluminescent material 12 can produce very intense light signals at a lower load. The harness can be controlled by using different resin or resin compositions/concentrations as the host matrix for triboluminescent material 12.

Figure 2A:
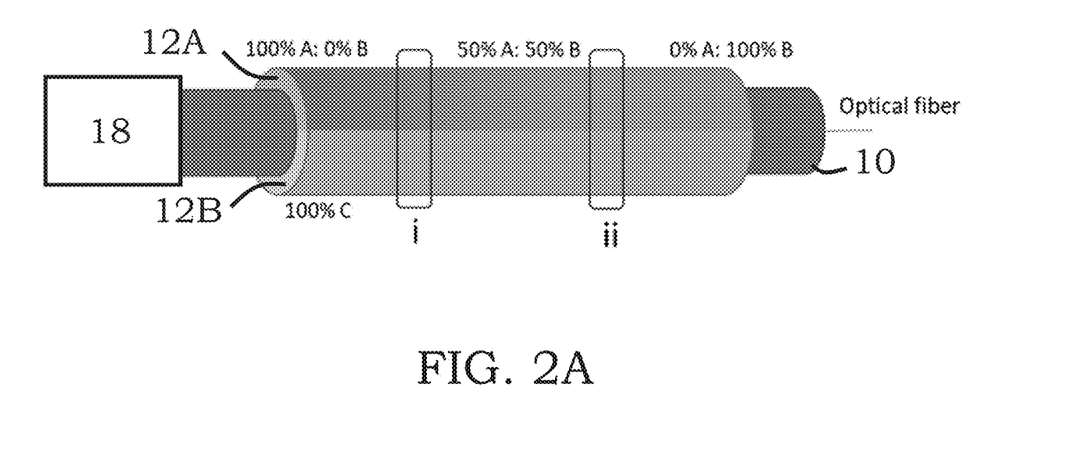
FIG. 2A depicts triboluminescent sensors coated with different materials compositions or concentrations.
Figure 2B:
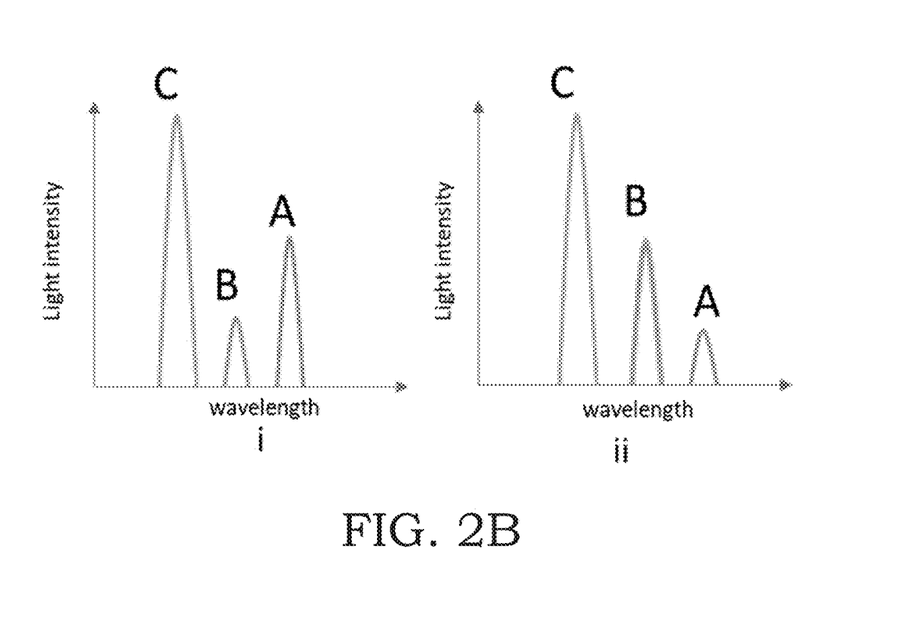
FIG. 2B depicts a schematic of triboluminescent signal responses at different coated regions (i and ii).

FIG. 2A depicts varying the compositions, concentrations, and/or the hardness of coating triboluminescent materials 12, A—C to control the sensitivity and responding range of triboluminescent sensors 14. FIG. 2B depicts the triboluminescent signal responses at region "i" from FIG. 2A and at region "ii" from FIG. 2A.

Example 2—New coating designs for triboluminescent sensors.

Figure 3:
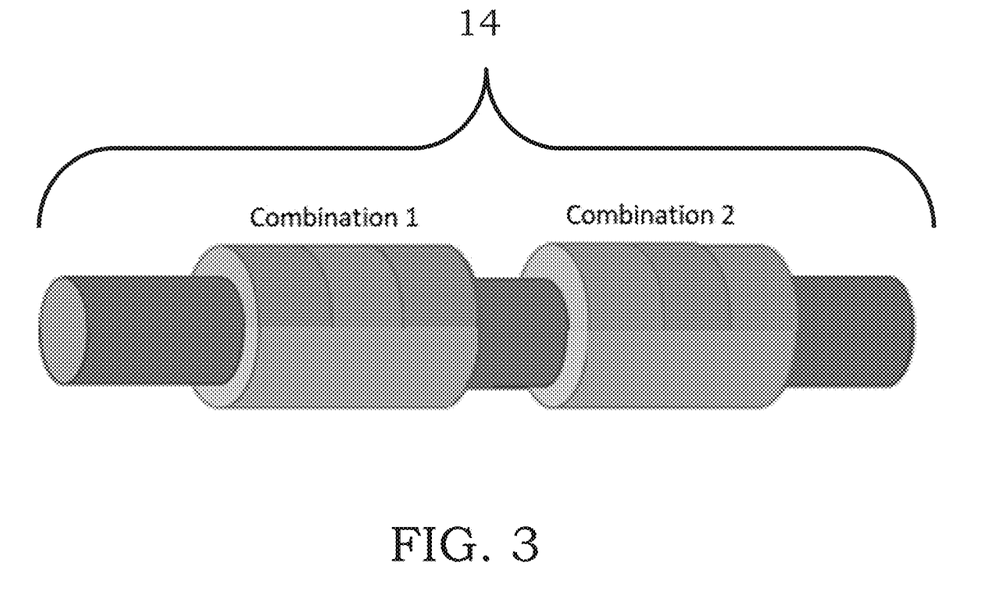
FIG. 3 depicts triboluminescent sensors coated with mixed design of strip and band.

The coating design for triboluminescent sensors 14 can be a strip design, band design, mixed design, or gradient. Strip design: Coating different strips of materials along the optical fiber's 10 axis. Band design: Coating different bands of materials perpendicular optical fiber's 10 axis. Mixed design: Coating different bands and strips of materials onto the optical fiber 10. Triboluminescent sensors 14 coated with mixed design of strip and band are depicted in FIG. 3. Gradient: Coating different materials with concentration/hardness gradient is depicted in FIG. 2A. Materials in a strip or band can be a mixture of materials at different compositions, concentrations and/or hardness.

These coating designs can be achieved using spray coating, masking. Furthermore, a thermal drawing approach can be utilized to produce these coating at macroscale before scaling them down to micro size.

Example 3—New applications for triboluminescent sensors.

Depending on the design of triboluminescent sensor 14 and its placement in target material 16, we can be able to detect the strength, location, and direction of the mechanical load before total damage. Tribolutninescent sensor 14 also can detect the size, location and type of damages as well as damage propagation's direction and speed.

A. Detection of location and strength of the mechanical load.

The intensity of triboluminescent emission is depended on the strength of the impact and the concentration/size of triboluminescent materials 12 themselves. The same emission intensity can be produced by using a high impact at low concentration or using low impact at high material concentration.

FIG. 2B represents the triboluminescent signal at different impacted locations on the triboluminescent sensor 14. Since the strip of material C is consistent, the intensity of the emission peaks generated by material C is directly related to the strength of the load and can be used to evaluate the load strength.

The presence of the top strip of the gradient design of material A and B will help to identify the location of the impact in the structure. There are more of material A and less material B at point i compares to point ii. The triboluminescent signal of material A at point i is more pronounce than point ii. The same phenomenon is also applied for material B at point i and ii. By using the strength value provided by material C, we can locate where is the signal originated from.

Although, a single triboluminescent material 12A of A (or B) can be used to determine the location of load, the introduction of second triboluminescent material 12B helps to increase the sensitivity of triboluminescent sensors 14 where the concentration of first material is low.

The same effect can be achieved by varying the material size, hardness, with a continuous or discrete variation.

B. Detection of strength, direction and bending point of mechanical load (flex sensors).

Since the triboluminescent emission signals are depending on the strength of the load. We can determine the direction of the load and the deformation of the structure by interpreting the signal from different triboluminescent sensors 14.

Figure 4:
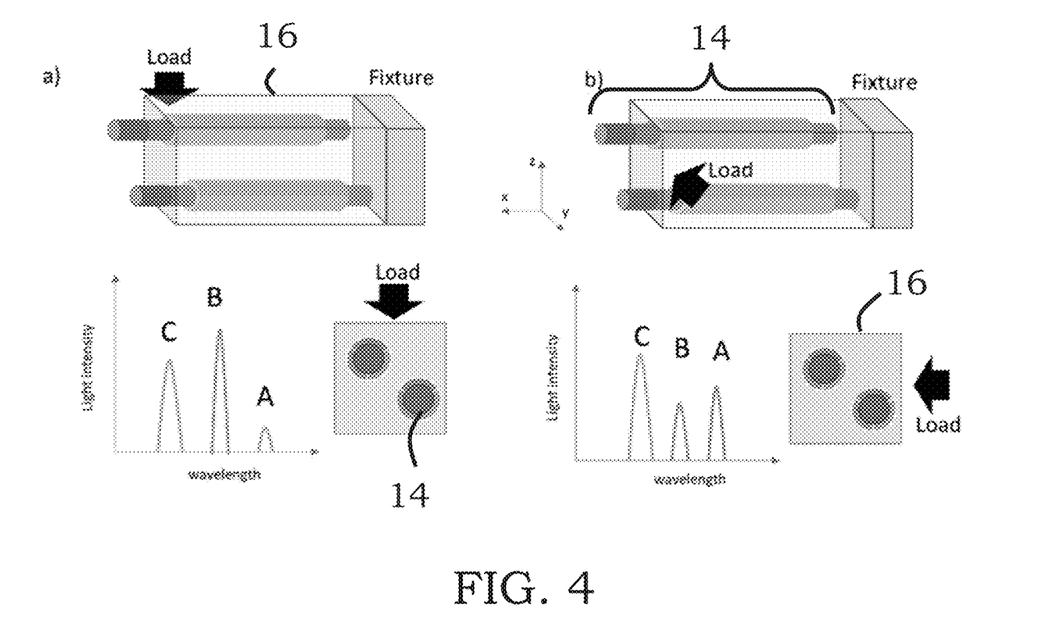
FIG. 4 depicts triboluminescent sensors coated with mixed design of strip and band in accordance with an embodiment of the present invention.
Figure 5:
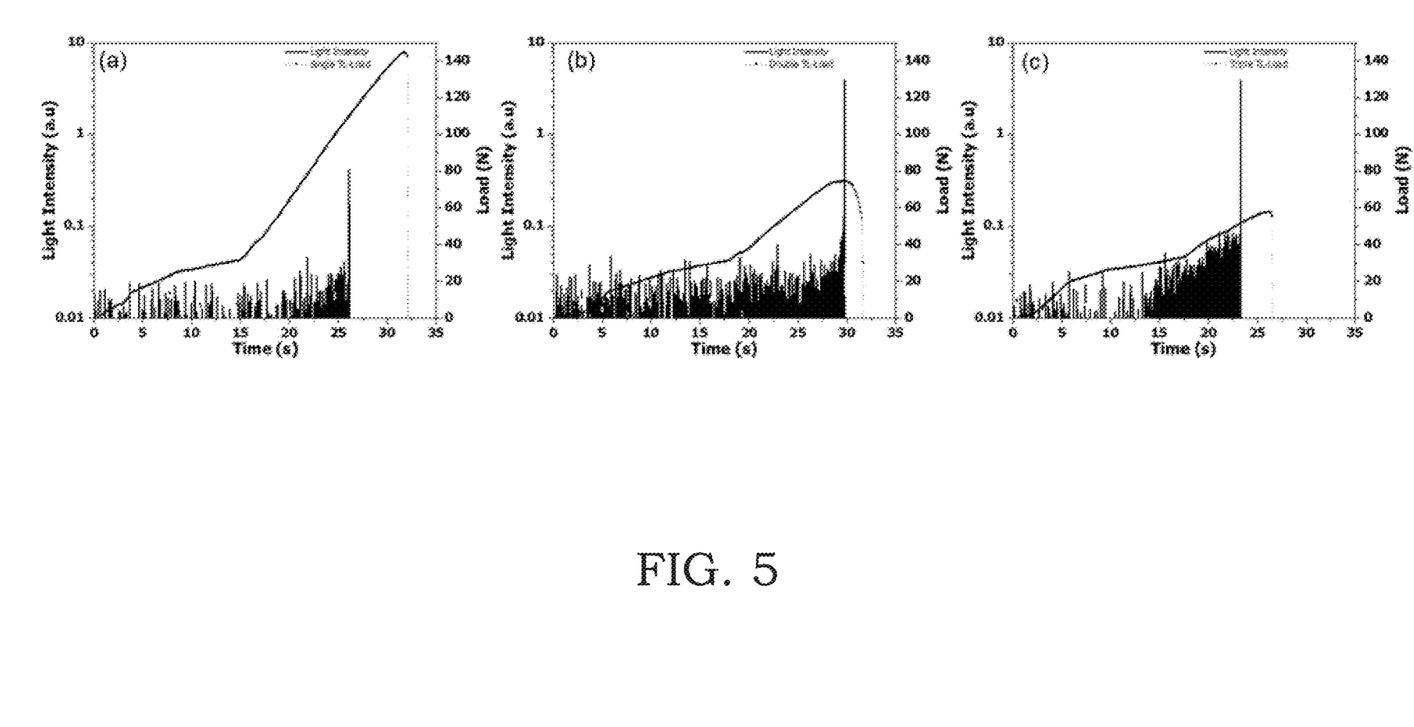
FIG. 5 depicts a comparison of the triboluminescent signal emission plots of samples with different triboluminescent crystal sizes and brittleness.

FIG. 4 shows the schematic of a structure with 2 embedded triboluminescent sensors 14. Under a mechanical load with the same strength, the difference between triboluminescent of the 2 triboluminescent sensors 14 responses depends on their location as well as the direction of the load. If the 2 triboluminescent sensors 14 are on the same side of the neutral plane during deformation, they are expected to have the same exact emission signal and signal ratio but with different intensity. If they are on a different side of tension and compression region, the difference in emission signal is more significant.

By comparing the emission signal between 2 triboluminescent sensors 14, we can determine the degree of deformation of target material 16. By using the strip design, we can identify the direction of the load. Additionally, we can detect where the bending occurs (bending point) by varying the triboluminescent materials 12 along the triboluminescent sensor's 14 axis (A).

C. Detection of damage propagation's direction and speed.

By correlating time and triboluminescent emission signals (intensity, wavelength) we can determine the speed and direction of the damage. Time-resolved measurement can be used with the same setting in FIG. 4 in which the delay between damage induced triboluminescent signal of triboluminescent sensor 1 and sensor 2 indicates the time needed for the damage to propagate inside the structure. With the capability to determine the location of the damage in real-time, we can also visualize the movement of the damage inside target material 16.

Figure 6:
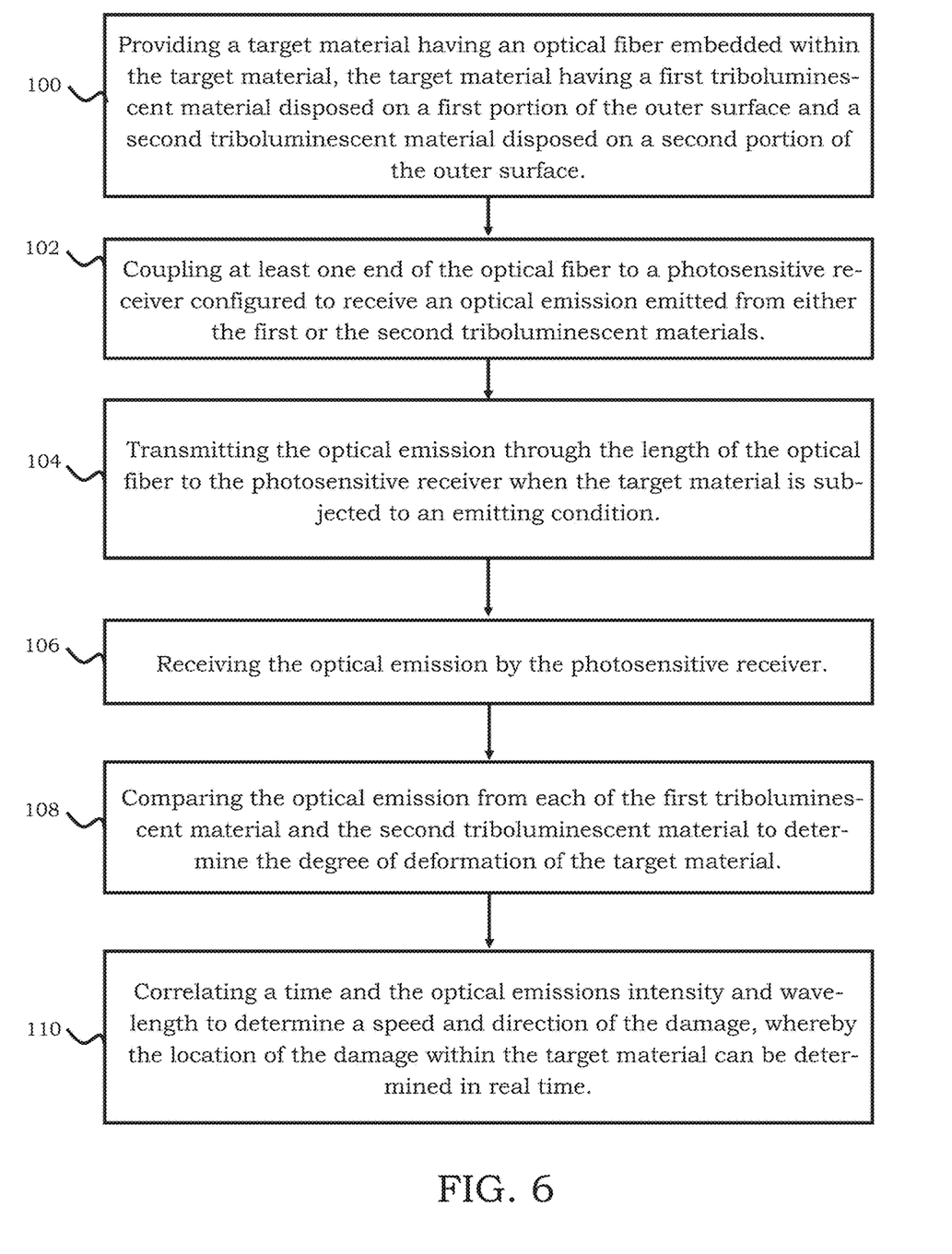
FIG. 6 depicts a process flow diagram of an exemplary method for detecting damage within a target material.

Referring now to FIG. 6, in conjunction with FIGS. 1-5, an exemplary process flow diagram is provided, depicting a method for detecting damage within target material 16. The steps delineated in the exemplary process flow diagram of FIG. 6 are merely exemplary of a preferred order for detecting damage within a target material 16. The steps may be carried out in another order, with or without additional steps included therein. Additionally, the steps may be carried out with an alternative embodiment of the triboluminescent sensor 14, as contemplated in the description above.

The method for detecting damage within target material 16 begins at step 100, during which target material 16 having optical fiber 10 embedded within target material 16 is provided. Optical fiber includes the components discusses above. The method then proceeds to step 102 in which at least one of the ends of optical fiber 10 is coupled to photosensitive receiver 18. Photosensitive receiver 18 is configured to receive an optical emission emitted from either first 12A or second 12B triboluminescent materials. In step 104, the optical emission is transmitted through the length of optical fiber 10 to photosensitive receiver 18 when target material 16 is subjected to an emitting condition. Next, at step 106, photosensitive receiver 18 receives the optical emission. In step 108, the optical emission from each of first triboluminescent material 12A and second triboluminescent 12B is compared to determine the degree of deformation of target material 16. In step 110, a time and the optical emissions intensity and wavelength are correlated to determine the speed and direction of the damage, whereby the location of the damage within target material 16 can be determined in real-time.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A triboluminescent sensing device for micro-detection of damage within a target material, the device comprising:
    an optical fiber embedded within the target material, the optical fiber including an outer surface having a first triboluminescent material disposed on a first portion of the outer surface, a second triboluminescent material disposed on a second portion of the outer surface and a third triboluminescent material disposed about the first portion and second portion of the outer surface;
    a photosensitive receiver operably coupled to at least one end of the optical fiber and configured to receive an optical emission emitted from the first, the second, or the third triboluminescent materials when the target material is subjected to an emitting condition;
    at least a portion of the optical emission is received by the optical fiber and guided through the length of the optical fiber to the photosensitive receiver, wherein the optimal emission is analyzed to provide information on the occurrence, severity, and location of damage within the target material;
    wherein the optical emission comprises an intensity and a wavelength, wherein the intensity and the wavelength emitted from the third triboluminescent material is analyzed by the photosensitive receiver, thereby determining a load strength of the emitting condition; and
    wherein the intensity and the wavelength emitted from the first, the second, and the third triboluminescent material is analyzed by the photosensitive receiver, whereby the difference in the optical emission between the first and the second triboluminescent material is compared to the optical emission of the third triboluminescent material, thereby determining an origin of the emitting condition.

2. The triboluminescent sensing device of claim 1, wherein first and the second triboluminescent materials are impregnated with triboluminescent crystals.

3. The triboluminescent sensing device of claim 2, wherein the triboluminescent crystals are selected from a group consisting of ZnS:Mn, EuD4TEA, ZnS:Cu, and a combination of thereof.

4. The triboluminescent sensing device of claim 1, wherein the first and the second triboluminescent materials are deposited on the outer surface of the optical fiber in a strip design, a band designs, gradient design, or combinations thereof.

5. The triboluminescent sensing device of claim 1, wherein the emitting condition is a compression, tension, stress, fracture, tear, or scratch of the target material.

6. The triboluminescent sensing device of claim 1, wherein the triboluminescent material has varying compositions, concentrations, and hardness to control the sensitivity and responding range of the optical fiber sensor.

7. The triboluminescent sensing device of claim 1, wherein the optical fiber is a polymethylmethacrylate based optical fiber.

8. The triboluminescent sensing device of claim 1, wherein the optical fiber is a polymer optical fiber, a glass-based optical fiber, a single-mode optical fiber, or a multi-mode optical fiber.

9. The triboluminescent sensing device of claim 1, further comprising a processor configured to run software and coupled to the photosensitive receiver to determine the occurrence and severity of the emitting condition.

10. The triboluminescent sensing device of claim 1, wherein the photosensitive receiver is a photo-multiplier tube.

11. The triboluminescent sensing device of claim 1, wherein the target material is selected from the group consisting of fiber-reinforced polymer composites, vinyl ester resins, epoxy adhesives, acrylonitrile butadiene styrene, or concrete.

12. The triboluminescent sensing device of claim 1, wherein each of the first, the second, and the third triboluminescent materials comprise a unique deformation characteristic selected from a group consisting of ductility, brittleness, and a combination of thereof.

13. A damage sensing system comprising:
a first optical fiber and a second optical fiber embedded within a target material, each of the first and the second optical fibers include an outer surface having a first triboluminescent material disposed on a first portion of the outer surface and a second triboluminescent material disposed on a second portion of the outer surface;
a photosensitive receiver operably coupled to at least one end of each of the first and the second optical fibers, the photosensitive receiver configured to receive an optical emission emitted from either the first or the second optical fiber when the target material is subjected to an emitting condition;
at least a portion of the optical emission is received by either the first or the second optical fiber and guided through the length of the optical fiber to the photosensitive receiver, wherein the one or more optical emissions are analyzed to provide information on the occurrence, severity, and location of damage within the target material; and the first optical fiber and the second optical fiber are separated by a predetermined distance;
wherein a delay between the optical emission of the first triboluminescent material and the second triboluminescent material, indicating a time required for damage propagation inside the structure, is analyzed by the photosensitive receiver to determine a speed and a direction of the emitting condition.

14. The damage sensing system of claim 13, wherein triboluminescent material is impregnated with triboluminescent crystals.

15. The damage sensing system of claim 14, wherein the triboluminescent crystals are selected from a group consisting of ZnS:Mn, EuD4TEA, ZnS:Cu, and a combination of thereof.

16. The damage sensing system of claim 13, wherein the triboluminescent material is deposited on the outer surface of the optical fiber in a strip design, a band designs, gradient design, or combinations thereof.

17. The damage sensing system of claim 13, wherein the emitting condition is a compression, tension, stress, fracture, tear, scratch of the target material.

18. The damage sensing system of claim 13, wherein the optical fiber is a polymer optical fiber, a glass-based optical fiber, a single-mode optical fiber, or a multi-mode optical fiber.

19. The damage sensing system of claim 13, wherein the photosensitive receiver is a photo-multiplier tube.

20. A method for detecting damage within a target material, the method comprising the steps of:
providing a target material having an optical fiber embedded within the target material, the optical fiber including an outer surface having a first triboluminescent material disposed on a first portion of the outer surface, and a second triboluminescent material disposed on a second portion of the outer surface, and a third triboluminescent material disposed about the first portion and second portion of the outer surface;
coupling at least one end of the optical fiber to a photosensitive receiver configured to receive an optical emission emitted from the first, the second, or the third triboluminescent materials;
transmitting the optical emission through the length of the optical fiber to the photosensitive receiver when the target material is subjected to an emitting condition, wherein the optical emission comprises an intensity and a wavelength;
receiving the optical emissions by the photosensitive receiver;
analyzing the difference in the optical emission from each of the first triboluminescent material and the second triboluminescent material to determine the degree of deformation of the target material; comparing the difference in the optical emission to the optical emission of the third triboluminescent material, thereby determining an origin of the emitting condition; and correlating a time of the optical emission and the origin of the emitting condition, thereby determining a speed and a direction of the emitting condition.

* * * * *